(12) United States Patent
Tiêu

(10) Patent No.: US 7,641,231 B2
(45) Date of Patent: Jan. 5, 2010

(54) GAS GENERATOR

(75) Inventor: Anh-Dung Tiêu, Heldenstein (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 387 days.

(21) Appl. No.: 11/258,338

(22) Filed: Oct. 25, 2005

(65) Prior Publication Data

US 2006/0086408 A1    Apr. 27, 2006

(30) Foreign Application Priority Data

Oct. 26, 2004   (DE)   ................. 20 2004 016 556 U

(51) Int. Cl.
*B60R 21/26*   (2006.01)

(52) U.S. Cl. ................ 280/736; 280/737; 280/741; 280/742

(58) Field of Classification Search ........ 280/736, 280/737, 741, 742; 102/530, 531, 202, 202.5, 102/202.12

See application file for complete search history.

(56) References Cited

U.S. PATENT DOCUMENTS

| | | | | |
|---|---|---|---|---|
| 3,089,418 A | * | 5/1963 | Stiefel | 102/531 |
| 4,512,355 A | | 4/1985 | Galbraith | |
| 5,031,932 A | * | 7/1991 | Frantom et al. | 280/741 |
| 5,076,607 A | * | 12/1991 | Woods et al. | 280/737 |
| 5,100,174 A | * | 3/1992 | Jasken et al. | 280/741 |
| 5,221,109 A | * | 6/1993 | Marchant | 280/736 |
| 5,263,740 A | * | 11/1993 | Frey et al. | 280/737 |
| 5,344,186 A | * | 9/1994 | Bergerson et al. | 280/741 |
| 5,360,232 A | * | 11/1994 | Lowe et al. | 280/741 |
| 5,464,247 A | * | 11/1995 | Rizzi et al. | 280/737 |
| 5,518,268 A | * | 5/1996 | Moore et al. | 280/737 |
| 5,536,039 A | * | 7/1996 | Cuevas | 280/737 |
| 5,536,040 A | * | 7/1996 | Cuevas et al. | 280/737 |
| 5,553,889 A | * | 9/1996 | Hamilton et al. | 280/736 |
| 5,570,904 A | * | 11/1996 | Cuevas | 280/737 |
| 5,586,783 A | * | 12/1996 | Adam et al. | 280/737 |
| 5,590,905 A | * | 1/1997 | Cuevas | 280/737 |
| 5,601,308 A | * | 2/1997 | Cuevas | 280/736 |
| 5,603,525 A | * | 2/1997 | Zakula | 280/737 |
| 5,642,903 A | * | 7/1997 | Headley | 280/737 |
| 5,803,493 A | * | 9/1998 | Paxton et al. | 280/737 |
| 5,957,492 A | * | 9/1999 | Hofbauer et al. | 280/737 |
| 5,967,550 A | | 10/1999 | Shirk et al. | |
| 6,010,153 A | * | 1/2000 | Halas et al. | 280/737 |
| 6,412,815 B1 | * | 7/2002 | Nakashima et al. | 280/736 |

(Continued)

FOREIGN PATENT DOCUMENTS

DE    2339610    2/1974

(Continued)

*Primary Examiner*—Paul N Dickson
*Assistant Examiner*—Laura Freedman
(74) *Attorney, Agent, or Firm*—Tarolli, Sundheim, Covell & Tummino LLP

(57) ABSTRACT

A gas generator has a first chamber containing a first amount of substance of a solid propellant providing filling gas and a second chamber containing a second amount of substance providing filling gas. An igniter is associated with the first chamber only. The first chamber has outflow openings providing a flow connection with an environment of the gas generator. After activation of the gas generator, the second chamber is connected with the environment of the gas generator with regard to flow exclusively via the first chamber.

15 Claims, 3 Drawing Sheets

U.S. PATENT DOCUMENTS

| | | | |
|---|---|---|---|
| 6,490,978 B1 * | 12/2002 | Perotto et al. | 102/531 |
| 6,612,326 B2 * | 9/2003 | Specht et al. | 137/68.13 |
| 2003/0030259 A1 * | 2/2003 | Saso et al. | 280/741 |
| 2009/0020032 A1 * | 1/2009 | Trevillyan | 102/276 |

FOREIGN PATENT DOCUMENTS

| | | |
|---|---|---|
| DE | 4019877 A1 * | 1/1992 |
| DE | 19620758 | 11/1997 |
| DE | 19846185 | 4/1999 |
| DE | 10062090 | 6/2002 |
| JP | 11157412 | 6/1999 |

* cited by examiner

GAS GENERATOR

TECHNICAL FIELD OF THE INVENTION

The invention relates to a gas generator.

BACKGROUND OF THE INVENTION

In gas generators, it is desired that the entire quantity of gas for filling a gas bag is not released in a sudden burst, but rather is released distributed over a certain period of time, and the solid propellant is burned as completely as possible. For this, multiple-stage gas generators are known, in which individual propellant charges can be ignited, staggered over time.

It is an object of the invention to provide by simple means a favourably priced gas generator of this type. It is also an object of the invention to realize, by simple means, a gas generator, the performance curve of which corresponds at least approximately to that of a two-stage gas generator with one igniter per propellant chamber.

BRIEF SUMMARY OF THE INVENTION

This is achieved in a gas generator having a first chamber containing a first amount of substance of a solid propellant providing filling gas and a second chamber containing a second amount of substance providing filling gas. An igniter is associated with the first chamber only. The first chamber has outflow openings providing a flow connection with an environment of the gas generator. After activation of the gas generator, the second chamber is connected with the environment of the gas generator with regard to flow exclusively via the first chamber. The gas developed in the second chamber or released therefrom does not flow directly to a filter chamber, but through the first chamber, in order to leave the gas generator. The time delay between the release of the gas from the two chambers results in an initially high but not too high pressure level for unfolding the gas bag. The gas subsequently originating from the second chamber leads to the full inflation of the gas bag. By the gas flowing into the first chamber, hitherto unburnt residues of the solid propellant can be ignited in the first chamber, so that the propellant is optimally utilized. In addition, the pressure conditions inside the gas generator can be adapted more simply when the second chamber does not have its own outflow openings. Immediately adjoining the chambers on the inner side are the propellants or amounts of substance providing filling gas.

The gas generator according to the invention behaves substantially like a conventional two-stage gas generator, in which each stage is ignited by means of its own igniter. The two stages are formed here by the first amount of substance (consisting of solid propellant) providing filling gas and the second amount of substance providing filling gas. The two amounts of substance providing filling gas respectively provide such a great quantity of gas that they can make a substantial contribution to the filling of a gas bag. The first amount of substance providing filling gas in fact is therefore not only an booster charge or a charge which only serves for the igniting or release of the second amount of substance providing filling gas.

Between the first and the second chamber, further propellant chambers or other spaces can be arranged. However, it is important that neither the second chamber nor one of the other spaces possibly lying between the first and the second chamber with regard to flow, has its own flow connection with the environment of the gas generator. All the gas generated or released in the chambers leaves the gas generator through the outflow openings of the first chamber. Of course, however, it would be possible to provide further independently ignitable groups of chambers with amounts of substance providing filling gas, which are separated from others with regard to flow and in which the same flow couplings as between the first chamber and the second chamber are provided.

The second amount of substance providing filling gas is formed in a first preferred embodiment by a second solid propellant charge. In another preferred embodiment, the second amount of substance providing filling gas is formed by a pressurized gas or liquid gas. The gas is preferably, but not compulsorily, combustible.

According to a preferred embodiment, the second chamber has no igniter of its own associated with it. The amount of substance providing filling gas in the second chamber is therefore not ignited or released by a separate igniter, but rather by over-ignition from the first chamber. As this process only takes place after a time delay, the release of the total gas quantity extends over a longer period of time than if propellant were ignited simultaneously in both chambers.

Preferably, at least one overflow opening is provided from the first chamber to the second chamber, the overflow opening being preferably only freed on exceeding of a predetermined pressure and/or temperature level in the first chamber. With the ignition of the first amount of substance providing filling gas in the first chamber, the second chamber, in a variant, is still separated from the first chamber with regard to flow. Only on exceeding the predetermined pressure or temperature is an overflowing of hot gas from the first chamber into the second chamber possible, which can then for example ignite the second amount of substance providing filling gas in the second chamber.

Preferably, the second chamber has at least one outflow opening freed only on exceeding of a predetermined pressure in the second chamber. With this construction, for example after hot gas has arrived into the second chamber through the overflow opening and has ignited the second amount of substance providing filling gas located there, a large outflow opening can be freed, connecting the second chamber with the first chamber. The pressure rise in the second chamber up to the exceeding of the predetermined pressure, through which the outflow opening is freed, takes place for example by the burning of the second amount of substance providing filling gas in the second chamber and/or owing to the temperature rise in the first and/or second chamber.

The overflow opening serves only for the purpose of over-igniting, i.e. the igniting of the second amount of substance providing filling gas in the second chamber or the creation of a first flow connection between the two chambers. It may therefore have a distinctly smaller cross-sectional area than the outflow opening, so that a distinct time delay is made possible between the igniting or releasing of the gas from the first and the second amount of substance providing filling gas.

In a preferred embodiment of the invention, the second chamber is separated from the first chamber by a dividing wall. Both chambers therefore lie immediately adjacent to each other, whereby a direct heat transmission takes place from the first chamber to the second chamber.

In one embodiment, the outflow opening is formed by a region of the dividing wall provided with at least one nominal fracture point or weakened zone. This region breaks out when the predetermined pressure is exceeded in the second chamber, and a large outflow opening into the first chamber is freed, through which the gas generated in the second chamber can flow unimpeded into the first chamber and from there out from the gas generator.

Alternatively, according to another embodiment, before the activation of the gas generator, the outflow opening can be closed by a plug which detaches itself from the dividing wall to free the outflow opening. The clamping of the plug is then selected so that the plug is securely connected with the dividing wall up to the reaching of the predetermined pressure in the second chamber.

In addition, at least one pyrotechnic delay element can be provided, e.g. at the closure of the overflow opening. The pyrotechnic delay element has a predetermined burning time, after which it brings about an ignition of the second amount of substance providing filling gas in the second chamber or a freeing of the overflow opening. The delay element can be designed so that it only ignites after receiving a particular amount of heat.

The delay element may be arranged directed to the first chamber and/or to the second chamber, with the respective arrangement offering a certain leeway to the specialist in the art in the setting of the delay period up to over-igniting, i.e. up to the ignition of the second amount of substance providing filling gas in the second chamber or the releasing of the gas stored therein.

DETAILED DESCRIPTION OF PREFERRED EMBODIMENTS

Figure 1:
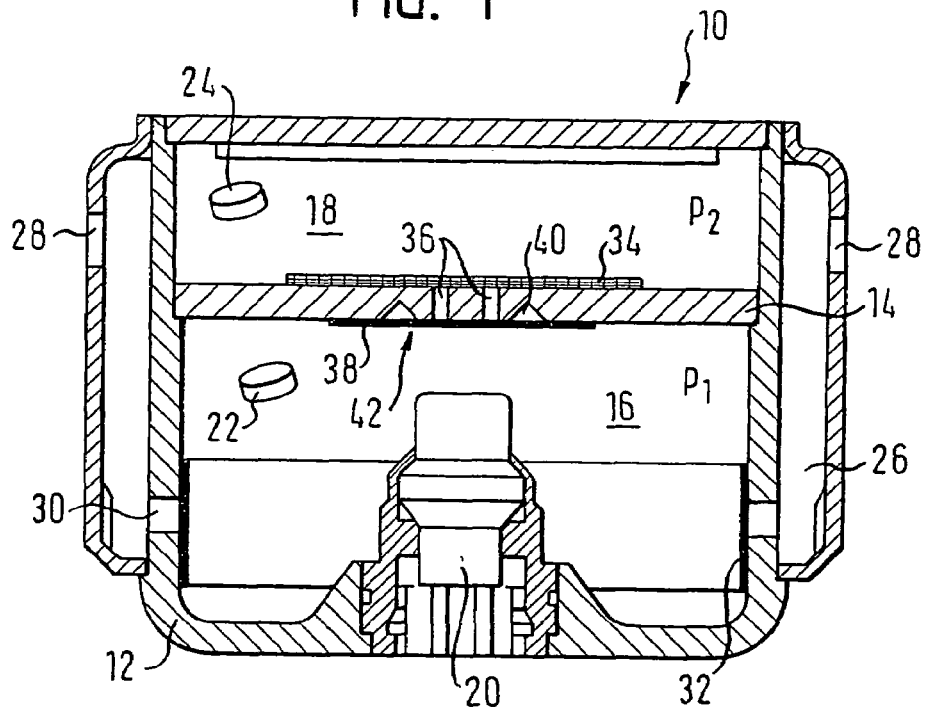
FIG. 1 shows a cross-section through a gas generator according to the invention in accordance with a first embodiment.

FIG. 1 shows a gas generator 10 according to a first embodiment, which can be inserted into a steering wheel in a driver's gas bag module. The invention is, however, also suitable for differently used gas generators.

The gas generator 10 has a cylindrical inner housing 12 which is divided by means of a dividing wall 14 into a first chamber 16 and a smaller second chamber 18. An igniter 20 projects into the first chamber 16. The first chamber 16 contains a first amount of substance 22 providing filling gas, which is formed by a quantity of solid propellant, illustrated here diagrammatically by an individual propellant tablet. The second chamber 18 contains a second amount of substance 24 providing filling gas, in this embodiment analogously a second quantity of solid propellant. The gas generator 10 shown in this example is a pure solid propellant generator; it therefore does not contain any stored compressed gas. Both chambers 16, 18 serve as combustion chambers in which the solid propellant burns.

The inner housing 12 is surrounded by a filter chamber 26 which has outflow openings 28 through which the gas generated by the gas generator 10 can arrive for example into a gas bag, which is not illustrated.

Only the first chamber 16, but not the second chamber 18, has outflow openings 20 to the filter chamber 26, i.e. openings which create a flow connection between a chamber filled with an amount of substance providing filling gas and the filter chamber 26, and via this with an environment of the gas generator 10. Only via the first chamber 16 and its outflow openings 30 is a flow connection created between the second chamber 18 and an environment of the gas generator 10, e.g. a gas bag. The second chamber 18 does not have a direct flow connection with the filter chamber 26. An insulation 32 is arranged in front of the outflow openings 30. Additionally, the outflow openings 30 and/or the outflow openings 28 may be closed before the activation of the gas generator 10 by a membrane which is not shown here, as is known from conventional gas generators, the membrane being destroyed only on the exceeding of a particular pressure.

In the second chamber 18, a filter mat 34 is arranged on the dividing wall 14.

The dividing wall 14 has several small overflow openings 36 which, as described below, can create an initial flow connection between the first chamber 16 and the second chamber 18. Before the activation of the gas generator 10, the overflow openings 36 are, however, closed in a gas-tight manner by a closure means 38.

In addition, in the dividing wall 14 a ring-shaped groove is constructed as a weakened zone 40 which surrounds the overflow openings 36. This groove defines the cross-section of an outflow opening 42 which, as described below, provides a second flow connection between the second chamber 18 and the first chamber 16. The filter mat 34 prevents the passage of propellant and coarse particles from the second chamber 18 into the first chamber 16 on exposure of the outflow opening 42.

On activation of the gas generator 10, via the igniter 20 firstly the first amount of substance 22 providing filling gas is ignited in the first chamber 16. Hereby, the pressure $p_1$ increases in the first chamber 16. On exceeding a predetermined first pressure value of the pressure $p_1$ in the first chamber 16, the closure means 38 frees the overflow openings 36. For this, the closure means 38 can burst. It can also be designed so that it is weakened by the temperature rise which occurs with the burning of the first amount of substance 22 providing filling gas. Now, a small quantity of hot gases can overflow from the first chamber 16 into the second chamber 18. Hereby, the second amount of substance 24 providing filling gas can be ignited in the second chamber 18. Owing to this, the pressure $p_2$ in the second chamber 18 rises. The overflow openings 36 have together only a small cross-sectional area, so that at this moment only a little gas overflows from the second chamber 18 into the first chamber 16. On exceeding a predetermined pressure in the second chamber, however, the weakened zone 40 yields and the central part of the dividing wall 14, which was surrounded by the weakened zone 40, detaches itself from the dividing wall 14. In this way, a large outflow opening 42 is freed, through which the gas can flow off unimpeded from the second chamber 18 into the first chamber 16. All the gas generated by the gas generator 10 flows through the outflow openings 30 into the filter chamber 26 and from there via the outflow openings 28 e.g. into a gas bag which is not shown.

The ignition of the second amount of substance 24 providing filling gas in the second chamber 18 takes place by over-igniting from the first chamber 16 after a certain delay period Δt able to be set in advance through the construction, which can lie between 5 and 60 ms and preferably amounts to 10 to 40 ms. Owing to this, firstly on activation of the gas generator 10 only a relatively small quantity of gas is released, namely that produced through the combustion of the first amount of substance 22 providing filling gas in the first chamber 16 leading to the "gentle" unfolding of the gas bag. Only after the delay period Δt is the gas additionally generated from the second amount of substance 24 providing filling gas, and flows out from the gas generator. On its way through the first chamber 16, the gas from the second chamber 18 additionally also promotes a complete burning of the hitherto unburnt residues of the first amount of substance 22 providing filling gas, which increases the quantity of gas and extends the overall time of gas generation.

For the case of filling a gas bag, therefore a very gentle inflation behaviour is produced, which is "gentle" for the vehicle occupant.

Figure 2:
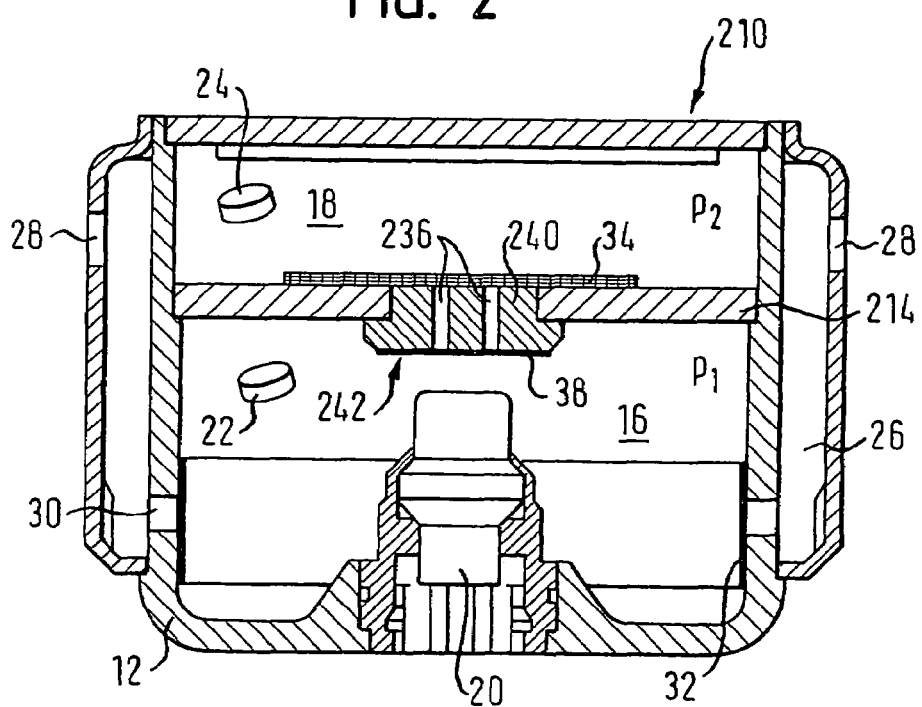
FIG. 2 shows a cross-section through a gas generator according to the invention in accordance with a second embodiment.

In FIG. 2 a second embodiment of a gas generator 210 is shown. This differs from the one described in the first embodiment merely in the design of the dividing wall 214. Therefore, the reference numbers already introduced are used again for the identical components.

In contrast to the first embodiment described above, the dividing wall 214 of the gas generator 210 does not have a weakened zone, but rather has a plug 240 which is fitted in for example by means of clamping. In the plug 240, overflow openings 236 are formed which, in turn, have a very much smaller overall cross-sectional area than the outflow opening 242 which is closed by the plug 240 in the dividing wall 214. The fastening of the plug 240 in the dividing wall 214 is designed so that the latter only detaches itself from the dividing wall 214 on exceeding of a predetermined pressure in the second chamber 18, and thus frees the outflow opening 242 from the second chamber 18 into the first chamber 16.

The mode of operation is analogous to that of the first embodiment. By means of the igniter 20, only the first amount of substance 22, consisting of a solid propellant charge, providing filling gas in the first chamber 16, is ignited. Owing to the increase in the pressure $p_1$ in the first chamber 16 and, optionally, in addition through a weakening owing to the increase of the temperature in the first chamber 16, the closure means 38 is destroyed, so that after a delay period Δt the overflow openings 236 towards the second chamber 18 are exposed. Owing to the overflowing of hot gases, the solid propellant charge forming the second amount of substance 24 providing filling gas in the second chamber 18 ignites. Thereupon, the pressure $p_2$ rises in the second chamber 18 until, on exceeding of a predetermined pressure value, the plug 240 detaches itself from the dividing wall 214 and frees the outflow opening 242. At this moment, a portion of the gas generated in the first chamber 16 has already flowed off via the outflow openings 30 and the filter chamber 26 through the outflow opening 28 into a gas bag, which is not shown. Only after the delay period Δt is the gas provided, which is generated from the second amount of substance 24 providing filling gas, which then flows off via the outflow opening 242 firstly into the first chamber 16 and from there, as described above, for example into a gas bag.

It is also possible initially not to close the overflow openings 36, 236. Also in this variant, the ignition of the second amount of substance 24 providing filling gas in the second chamber 18 takes place only after the elapse of the delay period Δt.

Figure 3:
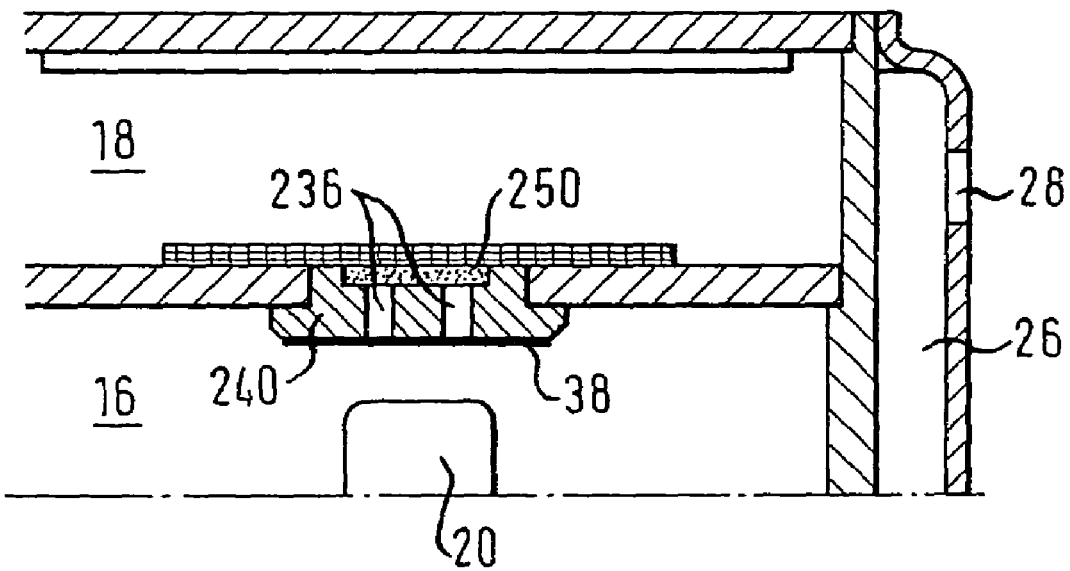
FIG. 3 shows an enlarged cut-out from FIG. 2, in which a first arrangement of a delay element is shown.
Figure 4:
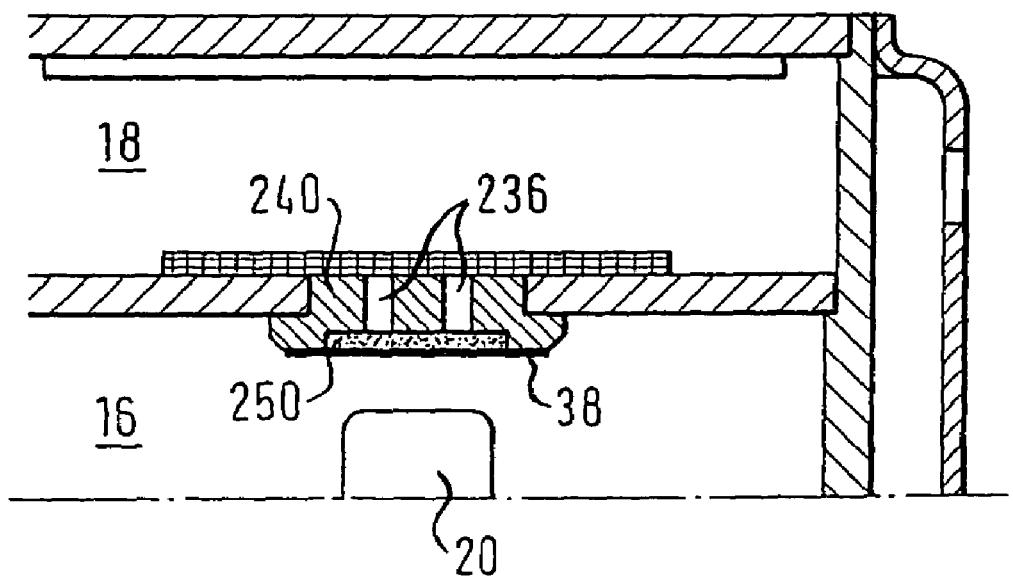
FIG. 4 shows an enlarged cut-out from FIG. 2, in which a second arrangement of the delay element is illustrated.

The delay period Δt can be additionally further increased by a pyrotechnic delay element 250 being used, as is shown in the variants according to FIGS. 3 and 4. Here, respectively on the side of the first chamber 16, the plug 240 is either provided at its end directed to the second chamber 18 or at its end directed to the chamber 16 with a pyrotechnic delay element 250 having a propellant quantity which burns pyrotechnically relatively slowly. This propellant quantity covers the overflow openings 236 and can also be positioned in the overflow openings 236. The delay element 250 permits an activation of the second chamber 18 only after a delay period determined by its design. In this way, the delay period Δt can be extended in line with specific objectives up to over-igniting, i.e. up to the start of the burning of the second amount of substance 24 providing filling gas in the second chamber 18.

Figure 5:
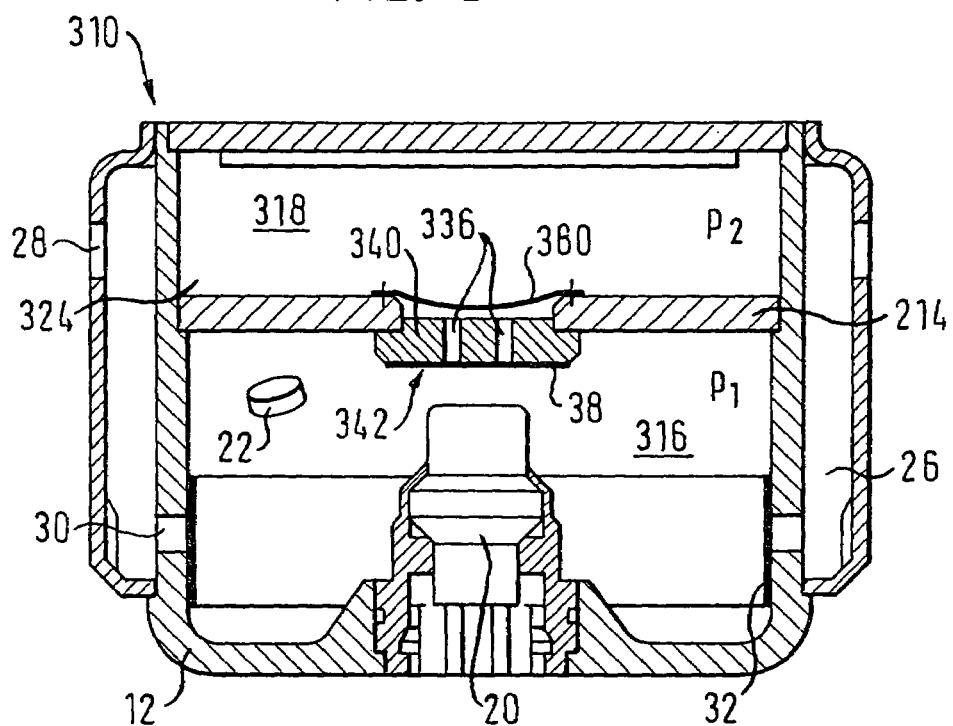
FIG. 5 shows a gas generator according to the invention in accordance with a third embodiment.
Figure 6:
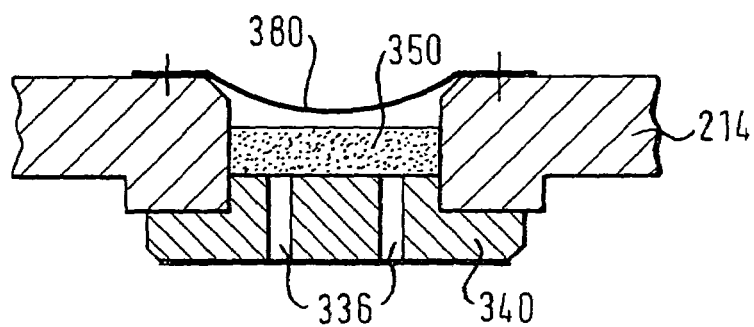
FIG. 6 shows an enlarged cut-out from FIG. 5 in accordance with a variant of the gas generator shown there.

In FIGS. 4 and 5, a gas generator 310 is shown according to a third embodiment, which differs from the one described hitherto substantially in that the second amount of substance 324 providing filling gas, arranged in the second chamber 318, is a pressurized gas or a liquid gas. The gas is preferably combustible, but could also be an inert gas or another suitable gas or gas mixture.

The outflow opening 342 between the first and the second chamber 316, 318 has a conventional membrane 380 stretched over it and is closed in a gas-tight manner before the activation of the gas generator 310.

The mode of operation corresponds to the one described above. On activation of the gas generator 310, the igniter 20 ignites the first amount of substance 22 providing filling gas, which in this case is also formed by a solid propellant charge. Hot gas arrives through the overflow openings 336 to the membrane 380 and brings about an opening of the membrane 380. The overflow openings 336 can firstly be closed by a closure means 38. Optionally, an opening aid 350 can be provided, which can be formed for example in an analogous manner to the pyrotechnic delay element 250 described above, the membrane 380 then being opened after the burning of the opening aid 350.

The opening of the membrane 380 takes place after the predetermined delay period Δt. With the bursting of the membrane 380, the plug 340 is also removed from the outflow opening 342, so that the gas stored in the second chamber 318 can flow through the large outflow opening 342 into the first chamber 316 and from there leaves the gas generator 310.

The second chamber 318 is constructed here as a pressure chamber, whilst the first chamber 316 functions as a combustion chamber as in the embodiments described above.

The performance curve of the gas generator according to the invention corresponds at least approximately to that of a two-stage gas generator, in which each chamber has its own igniter associated with it.

The described features of the individual embodiments can also be realized independently of each other and in any desired combination at the discretion of the specialist in the art.

The invention claimed is:

1. A gas generator comprising:
    a first chamber (16) containing a first amount of substance (22) of a solid propellant providing filling gas,
    a second chamber (18) containing a second amount of substance (24) providing filling gas,
    both the first chamber (16) and the second chamber (18) containing no stored compressed gas, and
    an igniter (20) associated only with the first chamber (16),
    the first chamber (16) having outflow openings (30) providing a flow connection with an environment of the gas generator (210),
    the second chamber (18), after activation of the gas generator being connected with the environment of the gas generator (10) with regard to flow exclusively via the first chamber (16).

2. The gas generator according to claim 1, wherein at least one overflow opening (236) directing gas from the first chamber (16) to the second chamber (18) is provided, said overflow opening (236) being freed only on exceeding at least one of a predetermined pressure and a temperature level in the first chamber (16).

3. The gas generator according to claim 1, wherein the second chamber (18) has at least one second chamber outflow opening (242) freed only on exceeding of a predetermined pressure in the second chamber (18).

4. The gas generator according to claim 3, wherein at least one overflow opening (236) directing gas from the first chamber (16) to the second chamber (18) is provided, the overflow opening (236) having a distinctly smaller cross-sectional area than the second chamber outflow opening (242).

5. The gas generator according to claim 3, wherein a dividing wall (14) separating the second chamber (18) from the first chamber (16) is provided and the outflow opening (42) is formed by a region of the dividing wall (14) provided with at least one nominal fracture point or weakened zone (40).

6. The gas generator according to claim 3, wherein a dividing wall (214) separating the second chamber (18) from the first chamber (16) is provided and the second chamber outflow opening (242) is closed by a plug (240) before the activation of the gas generator (210), the plug (240) detaching itself from the dividing wall (214) to free the second chamber outflow opening (242).

7. The gas generator according to claim 1, wherein the second chamber (18) is separated from the first chamber (16) by a dividing wall (214).

8. The gas generator according to claim 1, wherein at least one pyrotechnic delay element (250) is provided between the first chamber (16) and the second chamber (18).

9. The gas generator according to claim 8, wherein the delay element (250) is arranged directed to the first chamber (16).

10. The gas generator according to claim 8, wherein the delay element (250) is arranged directed to the second chamber (18).

11. The gas generator according to claim 1, wherein the second chamber (18) has no igniter of its own associated with it.

12. The gas generator according to claim 1, wherein the second filling gas providing amount of substance (24) in the second chamber (16) is a solid propellant.

13. The gas generator according to claim 1, wherein the second filling gas providing amount of substance (324) in the second chamber (316) comprises a pressurized gas or liquid gas.

14. A gas generator comprising:
a first chamber (16) containing a first amount of substance (22) of a solid propellant providing filling gas,
a second chamber (18) containing a second amount of substance (24) providing filling gas, and
an igniter (20) associated only with the first chamber (16),
the first chamber (16) having outflow openings (30) providing a flow connection with an environment of the gas generator (210),
the second chamber (18), after activation of the gas generator (210), being connected with the environment of the gas generator (210) with regard to flow exclusively via the first chamber (16),
at least one pyrotechnic delay element (250) having a propellant quantity separate from the first amount of substance (22) and having a predetermined burning time being provided between the first chamber (16) and the second chamber (18).

15. A gas generator comprising:
a first chamber (16) containing a first amount of substance (22) of a solid propellant providing filling gas,
a second chamber (18) containing a second amount of substance (24) providing filling gas,
a dividing wall (214) separating the second chamber (18) from the first chamber (16) being provided,
a second chamber outflow opening (242) being provided in the dividing wall (214), the second chamber outflow opening (242) being closed by a plug (240) before the activation of the gas generator (210), the plug (240) detaching itself from the dividing wall (214) to free the second chamber outflow opening (242),
an overflow opening (236) directing gas from the first chamber (16) to the second chamber (18) being formed in the plug (240), and
an igniter (20) associated only with the first chamber (16),
the first chamber (16) having outflow openings (30) providing a flow connection with an environment of the gas generator (210),
the second chamber (18), after activation of the gas generator (210), being connected with the environment of the gas generator (210) with regard to flow exclusively via the first chamber (16).

* * * * *

UNITED STATES PATENT AND TRADEMARK OFFICE
CERTIFICATE OF CORRECTION

| | | |
|---|---|---|
| PATENT NO. | : 7,641,231 B2 | Page 1 of 1 |
| APPLICATION NO. | : 11/258338 | |
| DATED | : January 5, 2010 | |
| INVENTOR(S) | : Anh-Dung Tiêu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this

Sixteenth Day of November, 2010

David J. Kappos
*Director of the United States Patent and Trademark Office*